(12) United States Patent
Kakani et al.

(10) Patent No.: US 7,321,562 B2
(45) Date of Patent: Jan. 22, 2008

(54) PACKET TRANSMISSION METHOD, NETWORK ELEMENT AND ARRANGEMENT

(75) Inventors: Naveen Kumar Kakani, Irving, TX (US); Christopher Clanton, Richardson, TX (US)

(73) Assignee: Nokia Corporation, Espoo (FI)

( * ) Notice: Subject to any disclaimer, the term of this patent is extended or adjusted under 35 U.S.C. 154(b) by 1065 days.

(21) Appl. No.: 10/634,986

(22) Filed: Aug. 6, 2003

(65) Prior Publication Data

US 2004/0240443 A1 Dec. 2, 2004

Related U.S. Application Data

(60) Provisional application No. 60/474,676, filed on Jun. 2, 2003.

(51) Int. Cl.
*H04J 1/16* (2006.01)
*H04J 3/16* (2006.01)

(52) U.S. Cl. .................................. 370/252; 370/465

(58) Field of Classification Search ..................... None
See application file for complete search history.

(56) References Cited

U.S. PATENT DOCUMENTS

| | | | |
|---|---|---|---|
| 6,424,643 B1 * | 7/2002 | Gutowski | 370/342 |
| 7,136,624 B2 * | 11/2006 | Ofuji et al. | 455/63.4 |
| 2003/0020651 A1 * | 1/2003 | Crilly et al. | 342/378 |
| 2003/0117964 A1 * | 6/2003 | Chen et al. | 370/252 |
| 2003/0233464 A1 * | 12/2003 | Walpole et al. | 709/231 |
| 2004/0210619 A1 * | 10/2004 | Balachandran et al. | 709/200 |

* cited by examiner

*Primary Examiner*—Andrew C. Lee
(74) *Attorney, Agent, or Firm*—Squire, Sanders & Dempsey, LLP

(57) ABSTRACT

A packet transmission method in a telecommunication network is provided. According to one embodiment, the method includes the steps of transmitting, estimating and controlling. The transmitting step transmits, in the network, packets of different priority on at least some connections. The estimating step estimates a value for the quality of service required for sending high priority packets with a given successful decoding probability. The controlling step controls the interference in the network such that the quality of service for each connection has at least the estimated value.

12 Claims, 2 Drawing Sheets

PACKET TRANSMISSION METHOD, NETWORK ELEMENT AND ARRANGEMENT

CROSS-REFERENCE TO RELATED APPLICATIONS

This application claims priority of U.S. Provisional Patent Application Ser. No. 60/474,676 entitled "Packet Transmission Method, Network Element and Arrangement," filed Jun. 2, 2003, the entire contents of which are incorporated herein by reference.

BACKGROUND OF THE INVENTION

1. Field of the Invention

The invention relates to a packet transmission method and arrangement in telecommunication networks. Especially the invention relates to improving the quality of service in connections employing packet transmission.

2. Description of the Related Art

In telecommunication networks, the quality of a connection may vary from time to time. This applies especially to radio networks where the quality of service is affected by interference and varying propagation conditions. In systems employing packet transmission, poor quality of service has an effect on packet throughput. In poor conditions packets may be dropped or received erroneously. These problems have been addressed by employing different kinds of error detection and error detection solutions. A typical solution is that a receiver acknowledges received information. The sender knows thus that the packets have been successfully received. If no acknowledgement is received, the sender may retransmit the information.

It is well known that interference decreases the quality of service in many systems. It has been proposed that some connections is given a higher priority than others. Thus, some connections may get more bandwidth or more robust coding and thus may experience somewhat better quality than low priority users. However, these users thus limit the capacity of the system and they still may experience low quality.

SUMMARY OF THE INVENTION

The invention provides a packet transmission solution where the quality of service may be improved. According to an embodiment of the invention, there is provided a packet transmission method in a telecommunication network. The method includes: transmitting, in the network, packets of different priority on at least some connections; estimating a value for the quality of service required for sending high priority packets with a given successful decoding probability; and controlling the interference in the network such that the quality of service for each connection has at least the estimated value.

According to another embodiment of the invention, there is provided an arrangement for packet transmission in a telecommunication network. The arrangement includes at least two network entities having a connection utilizing packet transmission and the entities being configured to transmit packets of different priority. The network includes means for estimating a value for the quality of service required for sending high priority packets with a given successful decoding probability, and means for controlling the interference in the network such that the quality of service for each connection has at least the estimated value.

According to another embodiment of the invention, there is provided a network element in a radio telecommunication network. The network element is configured to control radio resources for connections utilizing packet transmission, wherein the packet transmission includes packets of different priorities, the network element is configured to estimate a value for the quality of service required for the connections with the priority packets for sending high priority packets with a given successful decoding probability, and to control the interference in the network such that the quality of service for each connection with high priority packets has at least the estimated value.

The method and system of the invention provide several advantages. According to one embodiment of the invention, packets are thus categorized in different priority classes. An example of a high priority packet is an acknowledgement packet. The loss of an acknowledgement (ACK) packet lowers the throughput of a packet connection drastically, as it leads to redundant retransmissions. Thus, even if the system has a connection based priority in use and the link layer throughput is therefore maximized, the application level throughput may still very well be sub-optimal, as there may be redundant retransmissions of large packets due to ACK packet losses. In the embodiments of the invention the throughput probability of high priority packets is larger and thus the quality of service (QoS) experienced by a user is higher.

BRIEF DESCRIPTION OF THE DRAWINGS

In the following, the invention will be described in greater detail with reference to the embodiments and the accompanying drawings, in which.

DETAILED DESCRIPTION OF THE PREFERRED EMBODIMENTS

Figure 1:
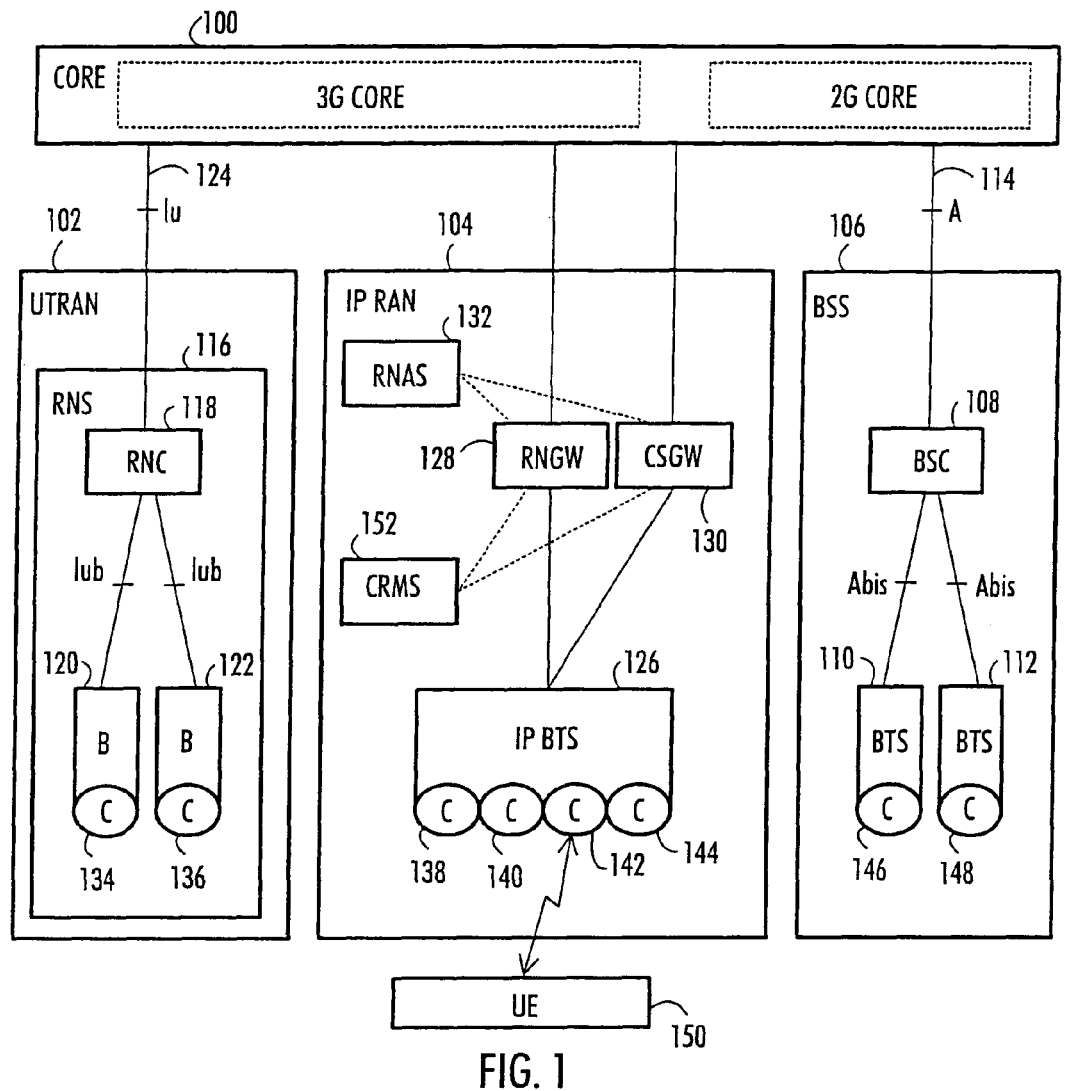
FIG. 1 shows an example of a data transmission network according to an embodiment of the invention.

With reference to FIG. 1, an example of a data transmission network to which the embodiments of the invention can be applied is shown. FIG. 1 illustrates a simplified radio system, which comprises the main parts of a radio system: a core network (CN) 100, radio access networks 102, 104, 106 and user equipment (UE) 150. The described network is a mobile telecommunications network, but the invention is not limited to such a network, as is clear to one skilled in the art.

FIG. 1 shows the general architecture of an evolutionary Third Generation (3G) radio system using different technologies and interoperation of different generations of radio access networks, wherein network elements of different generations coexist. The radio system of a 2.5 generation radio system is represented by a radio system which is based on the GSM (Global System for Mobile Communications) and which uses the EDGE technique (Enhanced Data Rates for Global Evolution) for increasing the data transmission rate and which can also be used for implementing packet transmission in the GPRS system (General Packet Radio System). The third generation radio system is represented by a radio system which is known at least by the names IMT-2000 (International Mobile Telecommunications 2000) and UMTS (Universal Mobile Telecommunications System).

The structure of the core network 100 is well known to one skilled in the art.

The Base Station Subsystem (BSS) 106 based on the GSM includes a base station controller (BSC) 108 and base transceiver stations (BTS) 110, 112. The base station controller 108 controls the base transceiver stations 110, 112. The interface 114 between the core network 100 and the BSS 106 is called A. The interface between the BSC 108 and BTS 110, 112 is called A-bis. Generally the devices implementing the radio path and their functions should be located in the base transceiver station 110, 112 and the management devices in the base station controller 108. Different implementations may, however, naturally exist.

The UMTS Radio Access Network (UTRAN) 102 includes radio network subsystems 116. Each Radio Network Subsystem (RNS) 116 includes radio network controllers (RNC) 118 and one or more nodes B 120, 122. Node B is rather an abstract concept and frequently is replaced by the term 'base station'. The interface between different radio network subsystems RNS 116 is called Iur. The interface 124 between the core network 100 and the UTRAN 102 is called Iu. The interface between the RNC 118 and node B 120, 122 is called Iub. In respect of its functionality, the radio network controller 118 approximately corresponds to the base station controller 108 of the GSM system, and node B 120, 122 to the base station 110, 112 of the GSM system. The invention may also be configured where the same device functions both as the base station and as node B, i.e. the device can simultaneously implement a TDMA (Time Division Multiple Access) and a WCDMA radio interface.

The radio system may use an IP technology based radio access network, i.e. an IP RAN (Internet Protocol Radio Access Network, IP Radio Access Network) 104. FIG. 1 shows the role of the IP RAN 104 in the radio system, using the IP RAN 104 as an example of a radio access network (RAN) to which the embodiments can be applied. The IP RAN 104 is a radio access network platform based on IP-technology also enabling interoperation with other, more conventional radio network access technologies and networks, such as the UTRAN (UMTS Radio Access Network) and GERAN (GSM EDGE Radio Access Network).

The IP RAN 104 includes the IP base stations (IP BTS) 126 which are connected to radio access network gateways that are the access points between IP RAN and the core network and other radio access networks. A Radio Network Access Gateway (RNGW) 128 provides a gateway for packet switched connections and a Circuit Switched Gateway (CSGW) 130 provides a gateway for circuit switched connections. Both gateways are controlled by a Radio Network Access Server (RNAS) 132. The IP RAN typically further includes a common resource management server (CRMS) 152, which is responsible for managing the radio resources between the base stations and the user equipment in the radio network. The IP RAN may also include other common servers and routers not illustrated in FIG. 1 for the sake of clarity. Not all possible connections between different entities in FIG. 1 are shown for the sake of clarity.

In IP RAN 104, most of the functions of the centralized controller (RNC 118 and BSC 108) are moved to the IP base station 126. In particular, all the radio interface protocols are terminated at the IP base station 126. Entities outside the IP base station 126 are needed for example to perform common configuration and radio resource (RR) functions, or to interwork with conventional radio access networks or base station subsystems or gateways to the core network 100.

FIG. 1 also illustrates the coverage areas, i.e. cells, of the base stations of the different radio access networks. Cells 134 and 136 thus represent the coverage areas of nodes B 120 and 122, and cells 146 and 148 represent the coverage areas of the base stations 110 and 112. One node B 120, 122, or base station 110, 112 may either serve one cell, as illustrated in FIG. 1, or several cells which in the case of base stations, can be sectored cells. The coverage area of the IP base station (IP BTS) 126, is represented by multiple cells 138 to 144 in the figure, but an IP BTS may also serve just one cell.

The user equipment 150 illustrated in FIG. 1 is in this example applicable to both 2G and 3G systems, including at least one transceiver for establishing a radio connection to the radio access network 104. Typically, the user equipment 150 is a mobile station, further having an antenna, a user interface and a battery. Various kinds of user equipment 150 are available, e.g. equipment installed in a car and portable equipment, and the user equipment 150 can also have properties similar to those of a personal computer or a portable computer. The user equipment 150 is connected to the radio system via the base stations of a radio access network, such as the IP RAN 104, for providing the user with access to the core network of the telecommunications system.

The user equipment may have several simultaneous connections to the network. A user may, for example, browse the Internet with a browser application, and simultaneously have another application running in the equipment, the application utilizing some network resource. The data flow of each connection is in principal independent of each other. As the connections share common transmission resources, the connections may interfere with each other. For example in WCDMA and GPRS systems, each connection may correspond to a Packet Data Protocol Context (PDPC). For each separate data flow the user equipment activates a PDP Context with the Core Network to be able to transmit and/or receive data through the network. The PDP Context as such is known to one skilled in the art.

In an embodiment, a connection is identified by a source IP (Internet Protocol) Address, Source port number, Destination IP Address and a Destination port number.

Packets transmitted on a connection may thus have different priorities. Each packet may contain bits or symbols that include information about the priority of the packet. In an embodiment, the priority of each packet is coded into the packet by endpoints. Thus, the originator of the packet codes the bits including priority information into the packet. In another embodiment, the coding is performed by the core network, for example by an SGSN (Serving GPRS Support Node) in the core network, before sending packets to the radio access network.

Preferred embodiments of the invention may be utilized regardless of the multiple access method used in a network. Thus, the embodiments may be used in systems with TDMA (Time Division Multiple Access) or WCDMA (Wideband Code Division Multiple Access).

In most radio systems, the available resources are allocated either as dedicated resources or as shared resources. Typically, dedicated resources are allocated permanently to a particular connection and shared resources are shared across the connections. For example, in the case of a WCDMA system, some codes are allocated as dedicated resources and some codes are available as a shared resource that can be used by multiple connections.

In radio telecommunication systems, there is usually a limitation on the number of connections that are allowed to use the radio resources simultaneously. In a TDMA based system, the limitation relates to the number of time slots available. The number of time slots in the system is usually fixed. However, in the case of CDMA or WCDMA systems, the limitation relates to the amount of interference (noise) in the system. The amount of interference in the system is a function of the number of connections using the radio resources. Thus, the amount of revenue (function of number of flows supported) generated and the quality of transmission are tradeoffs to be considered by the operator of the network.

Figure 2:
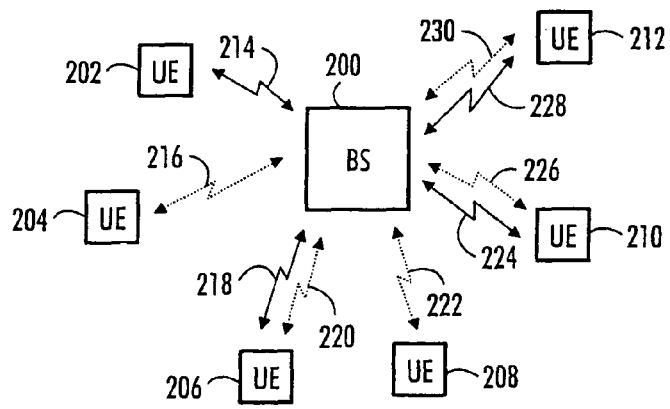
FIG. 2 illustrates connections in a network according to an embodiment of the invention.

FIG. 2 illustrates connections in an exemplary telecommunications network. FIG. 2 shows a base station 200 and a number of user equipment 202 to 212. Each user equipment of FIG. 2 has at least one connection 214 to 230 with the base station 200. In this example, the connections which have some important or high priority packets are marked with bold lines 212, 218, 224 and 228 and the connections with no high priority packets are marked with dashed lines 216, 220, 222, 226, 230. The priority level of each packet of a connection is determined between the transmitter and the receiver of the connection. Both the transmitting side and the receiving side are aware of the priority status of the packets. The priority may depend upon the type of the packet. For example, acknowledgement packets may be given a high priority in some types of connections, for example when a receiver is downloading a large amount of data from a source. There may also be other ways of determining the priority of the packets. The priority status of packets may vary during the lifetime of a connection.

An assumption made according to one embodiment of the invention is that the number of active connections in a network is N. The total interference experienced by the users in the network is denoted by I(N). Another assumption is that the number of connections with high priority packets is M. In general, received signals need to be decoded in a receiver with a given probability in order to meet the quality of service requirements set for each connection. Assume that the signal quality of a connection (i) required to obtain the transmitted data with a given probability X is denoted by Si. Thus, the probability of obtaining the transmitted data can be denoted by P(Si)=X. The amount of interference experienced by a connection (i) is denoted by Ii. Thus, S1, S2, . . . , SM denote the quality of signals required in connections with high priority packets for obtaining the transmitted data in the receivers with the given probability of X, and I1, I2, . . . , IM denote the interference levels in each connection with high priority packets. The objective is to ensure that the high priority packets can be decoded successfully. Thus, the total interference level I(N) of the system is controlled such that is satisfies the equation I(N)≦Min (I1, I2, . . . , IM), where Min( ) denotes the minimum of given values.

There are several different ways to control the interference level of the system. In an embodiment of the invention, the number of active connections is controlled so that the total interference is below the required limit. In an embodiment, when it is noticed that the total interference is too high and the above equation is not satisfied, the number of active connections is lowered by muting (i.e. no data is scheduled for these connections) connections until the total interference is below the given limit. In another embodiment, new connections are not allowed when the interference limit has been exceeded. As the active connections are released one by one, the total interference gradually reduces below the given limit. In another embodiment, some connections are reallocated to other, preferably lightly loaded carriers or channels.

In another embodiment, the total interference is controlled by reducing transmission powers of the connections. When it is noticed that the total interference is too high and the above equation is not satisfied, the transmission power of all or selected connections is reduced. Thus, the interference originating from these connections is reduced. For example, a base station controller or a radio network controller may reduce the maximum allowable transmission power in a network cell.

Combinations of different interference controlling methods may naturally also be used.

Figure 3A:
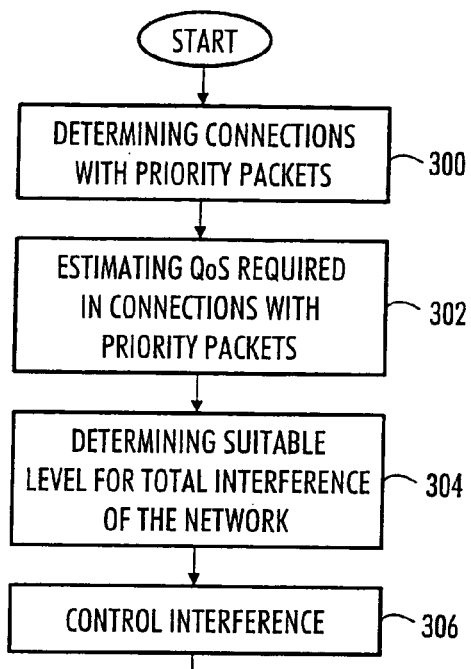
FIGS. 3A and 3B show flowcharts illustrating embodiments of the invention.

An embodiment of the invention is illustrated in the flowchart of FIG. 3A. In step 300, the connections with priority packets are determined. In step 302, the quality of service of the connections with priority packets required for obtaining the transmitted data in a receiver with a given probability is estimated or determined. In the following step 304, a level for the total interference of the system is determined on the basis of the estimated values, for example using the above equation. In step 306, the total interference is controlled on the basis of the estimation so that the interference level is below the required level.

The actions described above may be realized in the network for example in the network element responsible for the resource allocation of the network. This network element may vary depending on the structure of the network. Such elements may include a base station, a base station controller, a radio network controller and a common resource management server, for example.

In an embodiment of the invention, dedicated and shared resources are used dynamically, depending on the priority of the packets. This embodiment may be used in addition to the embodiment described above. In typical radio systems, resources are allocated to different connections. These resources may be either dedicated resources or shared resources. The type of resource allocated to a connection may be determined in the set up phase of a connection.

In an embodiment, when the selection and capacity of the resources allocated to a connection is performed, information about the existence of priority packets on the connection is taken into account. For example, when allocating dedicated resources to a connection, the connection is also allowed to use shared resources.

When a new connection with priority packets is being set up, the data rate requirements for the priority packets are determined. These can be determined on the basis of a Quality of Service class of the connection and system settings of the network operator. The connection is allocated to dedicated resources such that the data rate requirements of the priority packets can be met. For the rest of the packets the connection uses shared resources or dedicated resources if there is capacity unused by the priority packets.

Figure 3B:
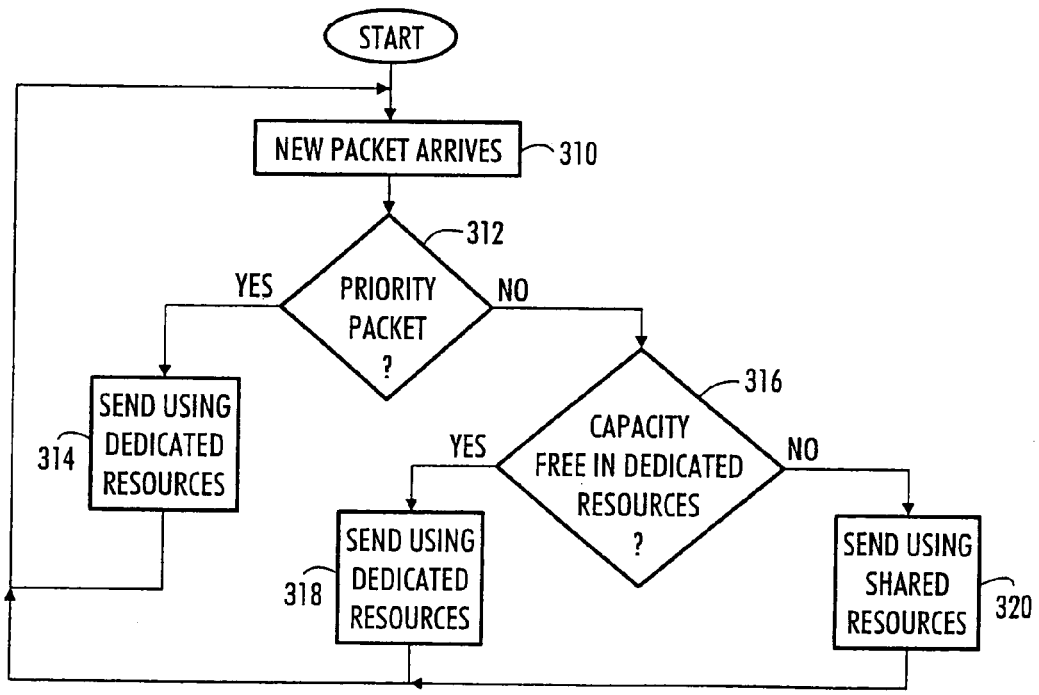

Transmission of packets according to the above embodiment is illustrated by the flowchart of FIG. 3B. In step 310, a new packet to be transmitted arrives. In step 312, it is determined whether the packet to be transmitted is a priority packet or not. If the packet is a priority packet, it is transmitted in step 314, using dedicated resources allocated for the connection. If the packet is not a priority packet, it is determined in step 316 whether there is currently free capacity on the dedicated resources allocated for the connection. If this is the case, the packet is transmitted in step 318, using dedicated resources. If this is not the case, shared resources are established and the packet is transmitted in step 320, using the shared resources.

Even though the invention has been described above with reference to an example according to the accompanying drawings, it is clear that the invention is not restricted thereto but it can be modified in several ways within the scope of the appended claims.

The invention claimed is:

1. A packet transmission method in a telecommunication network, the method comprising:
    transmitting, in a network, packets of different priority on at least some connections,
    estimating a value for a quality of service required for sending high priority packets with a given successful decoding probability, and
    controlling an interference in the network such that the quality of service for at least one connection has at least the estimated value.

2. The method of claim 1, comprising:
    estimating a maximum value for a maximum interference level allowed to send high priority packets with a given successful decoding probability, and
    controlling the interference in the network such that an interference level is below the estimated maximum interference level.

3. The method of claim 1, comprising:
    wherein the controlling step comprises controlling the interference by controlling a number of active connections in the network.

4. The method of claim 1, further comprising:
    controlling transmission powers of connections in the network.

5. The method of claim 1, further comprising:
    estimating, for at least one connection including high priority packets, a maximum value for a maximum interference level allowed to send high priority packets with a given successful decoding probability, and
    controlling the interference in the network such that an interference level is below a lowest estimated maximum interference level tolerated by connections in the network.

6. The method of claim 1, further comprising:
    allocating a given amount of resources of the network for at least one connection for transmitting the packets of the at least one connection,
    transmitting high priority packets using the allocated resources, and
    transmitting low priority packets using the allocated resources if there is a sufficient amount of capacity, and if the sufficient amount of capacity is not available, transmitting the low priority packets using resources shared between all connections.

7. An arrangement for packet transmission in a telecommunication network, the arrangement comprising at least two network entities having a connection utilizing packet transmission and the at least two network entities being configured to transmit packets of different priority, the network comprising:
    first estimating means for estimating a value for a quality of service required for sending high priority packets with a given successful decoding probability, and
    first controlling means for controlling an interference in a network such that the quality of service for at least one connection has at least the estimated value.

8. The arrangement of claim 7, further comprising:
    second estimating means for estimating a maximum value for a maximum interference level allowed for send high priority packets with a given successful decoding probability, and
    first controlling means for controlling the interference in the network such that an interference level is below an estimated interference level.

9. The arrangement of claim 7, wherein the first controlling means controls the interference by controlling a number of active connections in the network.

10. The arrangement of claim 7, further comprising:
    second controlling means for controlling the transmission powers of the active connections in the network.

11. The arrangement of claim 7, further comprising:
    allocating means for allocating a given amount of resources of the network for at least one connection for transmitting packets of the at least one connection,
    first transmitting means for transmitting high priority packets using the allocated resources, and
    second transmitting means for transmitting low priority packets using the allocated resources if there is a sufficient amount of capacity, and if the sufficient amount of capacity is not available, transmitting the low priority packets using resources shared between all connections.

12. A network element in a radio telecommunication network, the network element being configured to:
    control radio resources for connections utilizing packet transmission, wherein the packet transmission comprises packets of different priorities;
    estimate a value for a quality of service required for the connections including priority packets for sending high priority packets with a given successful decoding probability; and
    control an interference in the network such that the quality of service for at least one connection including high priority packets has at least an estimated value.

* * * * *